US009045600B2

(12) United States Patent
Kelly et al.

(10) Patent No.: US 9,045,600 B2
(45) Date of Patent: Jun. 2, 2015

(54) BIOPOLYMER MATERIALS

(75) Inventors: Robert James Kelly, Christchurch (NZ); Clive Marsh, Christchurch (NZ)

(73) Assignee: Keraplast Technologies, Ltd., San Antonio, TX (US)

( * ) Notice: Subject to any disclaimer, the term of this patent is extended or adjusted under 35 U.S.C. 154(b) by 210 days.

(21) Appl. No.: 13/320,155

(22) PCT Filed: May 13, 2010

(86) PCT No.: PCT/US2010/034723

§ 371 (c)(1), (2), (4) Date: Jan. 12, 2012

(87) PCT Pub. No.: WO2010/132673

PCT Pub. Date: Nov. 18, 2010

(65) Prior Publication Data

US 2012/0104656 A1    May 3, 2012

Related U.S. Application Data

(60) Provisional application No. 61/177,948, filed on May 13, 2009.

(51) Int. Cl.
| | |
|---|---|
| B29C 67/24 | (2006.01) |
| C08H 1/06 | (2006.01) |
| C08J 3/24 | (2006.01) |
| C08L 89/04 | (2006.01) |

(52) U.S. Cl.
CPC ... C08H 1/06 (2013.01); C08J 3/24 (2013.01); C08J 2389/04 (2013.01); C08L 89/04 (2013.01); C08L 2205/16 (2013.01)

(58) Field of Classification Search
CPC .......... C08H 1/06; C08J 3/24; C08J 2389/04; C08L 89/04; C08L 2205/16; C08K 5/0025; C08K 5/0016; C08K 5/053
USPC ............... 264/330, 319; 530/357; 106/156.51
See application file for complete search history.

(56) References Cited

U.S. PATENT DOCUMENTS

| | | | |
|---|---|---|---|
| 1,974,554 A | 9/1934 | Ziegler | |
| 2,401,479 A | 6/1946 | Hall et al. | |
| 2,542,984 A * | 2/1951 | Binkley | ......................... 530/357 |
| 2,993,794 A | 7/1961 | Moshy | |
| 3,642,498 A | 2/1972 | Anker | |
| 3,644,084 A | 2/1972 | Hsiung et al. | |
| 3,970,614 A | 7/1976 | Goodwin | |
| 4,060,081 A | 11/1977 | Yannas et al. | |
| 4,135,942 A | 1/1979 | Kikkawa | |
| 4,141,888 A | 2/1979 | Matsuda et al. | |
| 4,357,274 A | 11/1982 | Werner | |
| 4,369,037 A | 1/1983 | Matsunaga et al. | |
| 4,439,417 A | 3/1984 | Matsunaga et al. | |
| 4,495,173 A | 1/1985 | Matsunaga et al. | |
| 4,570,629 A | 2/1986 | Widra | |
| 4,751,074 A | 6/1988 | Matsunaga et al. | |
| 4,766,005 A | 8/1988 | Montgomery et al. | |
| 4,818,520 A | 4/1989 | Fleischner | |
| 4,839,168 A | 6/1989 | Abe et al. | |
| 4,895,722 A | 1/1990 | Abe et al. | |
| 4,948,876 A | 8/1990 | Bore et al. | |
| 4,959,213 A | 9/1990 | Brod et al. | |
| 5,047,249 A | 9/1991 | Rothman et al. | |
| 5,134,031 A | 7/1992 | Kagechi et al. | |
| 5,276,138 A | 1/1994 | Yamada et al. | |
| 5,292,362 A | 3/1994 | Bass et al. | |
| 5,304,378 A | 4/1994 | Koga et al. | |
| 5,358,935 A | 10/1994 | Smith et al. | |
| 5,444,154 A | 8/1995 | O'Lenick, Jr. | |
| 5,474,770 A | 12/1995 | Broly et al. | |
| 5,487,889 A | 1/1996 | Eckert et al. | |
| 5,543,164 A | 8/1996 | Krochta et al. | |
| 5,552,452 A | 9/1996 | Khadem et al. | |
| 5,660,857 A | 8/1997 | Haynes et al. | |
| 5,763,583 A | 6/1998 | Arai et al. | |
| 5,766,534 A | 6/1998 | White et al. | |
| 5,824,113 A | 10/1998 | Hojo | |
| 5,932,552 A | 8/1999 | Blanchard et al. | |
| 5,948,432 A | 9/1999 | Timmons et al. | |
| 6,110,487 A | 8/2000 | Timmons et al. | |
| 6,124,265 A | 9/2000 | Timmons et al. | |
| 6,140,475 A | 10/2000 | Margolin et al. | |
| 6,159,495 A | 12/2000 | Timmons et al. | |
| 6,165,496 A | 12/2000 | Timmons et al. | |
| 6,270,791 B1 | 8/2001 | Van Duke et al. | |
| 6,270,793 B1 | 8/2001 | Van Dyke et al. | |

(Continued)

FOREIGN PATENT DOCUMENTS

| | | |
|---|---|---|
| CN | 1056986 A | 12/1991 |
| DE | 531466 | 8/1938 |

(Continued)

OTHER PUBLICATIONS

Katoh et al., "Preparation and physicochemical properties of compression-molded keratin films", 2003, Elsevier: Biomaterials, pp. 2265-2272.*
"Abstracts of Papers Part 3," 216th ACS National Meeting 0-8412-3627-5, American Chemical Society, Aug. 23-27, 1998.
Schrooyen, P.M.M., et al., "Polymer Preprints," American Chemical Society, vol. 39, No. 2, Aug. 1998.
Brunner, Helmut, et al., "Fractionation of Tyrosine-Rich Proteins from Oxidized Wool by Ion-Exchange Chromatography and Preparative Electrophoresis," Eur. J. Biochem. 32, 350-355 (1973).
Choi, Jong-Myung, et al., "Developing a Slow-release Nitrogen Fertilizer from Organic Sources: II. Using Poultry Feathers," J. Amer. Soc. Hort. Sci. 121(4):634-638, 1996.
Chye, Tan Thiam, "Human Hair Waste and Its Potential Utilization," J. of the Singapore National Academy of Science, vol. 8, 1979.
Dale, H. N., "Keratin and other coatings for pills," The pharmaceutical J. and Pharmacist, Dec. 10, 1932.

(Continued)

*Primary Examiner* — Jill Heitbrink
(74) *Attorney, Agent, or Firm* — Vinson & Elkins LLP

(57) ABSTRACT

Molded articles of pure keratin protein, keratin copolymers or crosslinked keratin proteins are produced from a wetted protein powder by application of compression and optionally heat. Stabile materials can be molded or machined.

16 Claims, No Drawings

(56) References Cited

U.S. PATENT DOCUMENTS

| | | | |
|---|---|---|---|
| 6,274,155 | B1 | 8/2001 | Van Dyke et al. |
| 6,274,163 | B1 | 8/2001 | Blanchard et al. |
| 6,280,474 | B1 | 8/2001 | Cassidy et al. |
| 6,303,150 | B1 | 10/2001 | Perrier et al. |
| 6,316,598 | B1 | 11/2001 | Van Dyke et al. |
| 6,371,984 | B1 | 4/2002 | Van Dyke et al. |
| 6,379,690 | B2 | 4/2002 | Blanchard et al. |
| 6,432,435 | B1 | 8/2002 | Timmons et al. |
| 6,461,628 | B1 | 10/2002 | Blanchard et al. |
| 6,544,548 | B1 | 4/2003 | Siller-Jackson et al. |
| 6,565,842 | B1 | 5/2003 | Sojomihardjo et al. |
| 6,649,740 | B1 | 11/2003 | Smith et al. |
| 6,827,948 | B2 | 12/2004 | Stoltz |
| 6,849,092 | B2 | 2/2005 | Van Dyke et al. |
| 6,914,126 | B2 | 7/2005 | Van Dyke et al. |
| 6,989,437 | B2 | 1/2006 | Van Dyke et al. |
| 7,001,987 | B2 | 2/2006 | Van Dyke et al. |
| 7,001,988 | B2 | 2/2006 | Van Dyke et al. |
| 7,066,995 | B1 | 6/2006 | Barone et al. |
| 7,148,327 | B2 | 12/2006 | Kelly et al. |
| 7,169,896 | B2 | 1/2007 | Schrooyen et al. |
| 7,169,897 | B2 | 1/2007 | Haldeman et al. |
| 7,297,342 | B2 | 11/2007 | Peplow et al. |
| 7,465,321 | B2 | 12/2008 | Kelly et al. |
| 7,501,485 | B2 | 3/2009 | Cowsar |
| 7,479,317 | B2 | 8/2009 | Kelly et al. |
| 7,732,574 | B2 | 6/2010 | Kelly et al. |
| 7,767,756 | B2 | 8/2010 | Kelly et al. |
| 7,892,572 | B2 | 2/2011 | Peplow et al. |
| 8,101,202 | B2 | 1/2012 | Branham et al. |
| 8,124,735 | B2 | 2/2012 | Kelly et al. |
| 8,142,807 | B2 | 3/2012 | Kelly et al. |
| 8,324,346 | B2 | 12/2012 | Cowsar |
| 2002/0029083 | A1* | 3/2002 | Zucherman et al. ....... 623/17.16 |
| 2002/0148572 | A1 | 10/2002 | Griffith |
| 2005/0124797 | A1* | 6/2005 | Kelly et al. .................... 530/357 |
| 2006/0084728 | A1 | 4/2006 | Barone et al. |
| 2007/0128134 | A1 | 6/2007 | Umeda et al. |
| 2008/0089930 | A1 | 4/2008 | Siller-Jackson et al. |
| 2008/0249451 | A1* | 10/2008 | Branham et al. ................ 602/42 |
| 2012/0104656 | A1 | 5/2012 | Kelly et al. |
| 2012/0219667 | A1 | 8/2012 | Kelly et al. |

FOREIGN PATENT DOCUMENTS

| | | | |
|---|---|---|---|
| EP | 0 454 600 | A1 | 4/1990 |
| JP | 354089987 | A | 7/1979 |
| JP | 56129035 | | 10/1981 |
| JP | 57109797 | | 7/1982 |
| JP | 59-155248 | | 9/1984 |
| JP | 1197423 | | 8/1989 |
| JP | 04091138 | A | 6/1990 |
| JP | 3011099 | | 1/1991 |
| JP | 3294297 | | 12/1991 |
| JP | 404091138 | A | 3/1992 |
| JP | 44281856 | | 10/1992 |
| JP | 4312534 | | 11/1992 |
| JP | 5285374 | | 11/1993 |
| JP | 5285375 | | 11/1993 |
| JP | 1993285374 | | 11/1993 |
| JP | 1993285375 | | 11/1993 |
| JP | 6116300 | | 4/1994 |
| JP | 1994100600 | | 4/1994 |
| JP | 06293631 | | 10/1994 |
| JP | 6336499 | | 12/1994 |
| JP | 10291998 | | 11/1998 |
| JP | 1998291999 | | 11/1998 |
| JP | 6-100600 | | 5/1999 |
| JP | 2001087754 | | 4/2001 |
| RU | 2106154 | C1 | 3/1998 |
| WO | WO 99 26570 | | 6/1999 |
| WO | WO 99/26595 | | 6/1999 |
| WO | WO 99/51175 | | 10/1999 |
| WO | WO 00/76437 | | 12/2000 |
| WO | WO 01/19283 | | 3/2001 |
| WO | WO 01 19305 | | 3/2001 |
| WO | WO 01/64033 | | 9/2001 |
| WO | WO 02/076336 | | 10/2002 |
| WO | WO 03018673 | | 3/2003 |
| WO | WO 03/035722 | | 5/2003 |
| WO | WO 03/064449 | | 8/2003 |
| WO | WO 03/086491 | | 10/2003 |
| WO | WO 03/087156 | | 10/2003 |
| WO | WO 03 087195 | | 10/2003 |
| WO | WO 03/087197 | | 10/2003 |
| WO | WO 03 003737 | | 12/2003 |
| WO | WO 2004 011052 | | 2/2004 |
| WO | WO 2005 058380 | | 6/2005 |
| WO | WO 2005 124011 | | 12/2005 |
| WO | WO 2005 124013 | | 12/2005 |
| WO | WO 2006 021700 | | 11/2006 |
| WO | WO 2008 040357 | | 4/2008 |

OTHER PUBLICATIONS

Dowling, L. M., et al., "Isolation of components from the low-sulphur proteins of wool by fractional precipitation," Preparative Biochemistry, 4(3), 203-226 (1974).

Eaglstein, William, H., et al, "Wound Dressings: current and future," Clinical and experimental approaches to dermal and epidermal repair: Normal and Chronic Wounds, pp. 257-265, 1991.

Fraser, R. D. B., et al., "Tyrosine-rich proteins in keratins," Comp. Biochem. Physiol., 1973, vol. 44B, pp. 943-947.

Fraser, R. D. Bruce, et al., "Intermediate filaments of a α-keratins," Proc Natl. Acad. Sci. USA, vol. 83, pp. 1179-1183, Mar. 1986.

Gillespie, J. M., et al., "A comparative study of high-sulphur proteins from a-α-keratins," Comp. Biochem. Physiol., 1965, vol. 15, pp. 175-185.

Gillespie, J. M., et al., "Evidence of Homology in a High-Sulphur Protein Fraction (SCMK-B2) of Wool and Hair α-Keratins," Biochem. J. (1968) 110. 193.

Gillespie, J.M., "Proteins rich in glycine and tyrosine from keratins," Comp. Biochem. Physiol., 1972, vol. 41B, pp. 723-724.

Goddard, David R., et al., A study on keratin, J. Bio. Chem., 1934; 106: 605-14.

Hadas, Aviva, et al., "Feather meal, a semi-slow-release nitrogen fertilizer for organic farming," Fertilizer Research 38: 165-170, 1994.

Hanukoglu, Israel, et al., "The cDNS Sequence of a Human Epidermal Keratin: Divergence of Sequence but C onservation of Structure among Intermediate Filament Proteins," Cell, vol. 31, 243-252, Nov. 1982.

Harrap, B. S., et al., "Species Differences in the Proteins of Feathers," Comp. Biochem. Physiol., 1967, vol. 20, pp. 449-460.

Dedeurwaerder, R. A., et al., "Selective Extraction of a Protein Fraction From Wool Keratin," Nature, 1964.

Harrap, B.S., et al., "Soluble Derivatives of Feather Keratin," Wool Research Laboratories, Melbourne, Victoria, Australia, Sep. 10, 1963.

Horn, et al., "Isolation of a new sulfur-containing amino acid (lanthionine) from sodium carbonate-treated wool," J. Biol. Chem., Mar. 1941; 138: 141-149.

Jones, Leslie N., "Studies on Microfibrils from α-Keratin," Biochimia et Biophysica Acta 1976.

Kuczek, Elizabeth, S., et al., "Sheep wool (glycine + tyrosine)-rich keratin genes," Eur. J. Biochem, 166, 79-85 (1987).

Lindley, H., et al., "The Preparation and Properties of a Group of Proteins from the High-Sulphur Fraction of Wool," Biochem. J. (1972) 128, 859-867.

Lindley, H., et al., "The Reactivity of the Disulphide Bonds of Wool," The Biochemical Journal, vol. 139, No. 2, 515-523 (1974).

Mack, James W., et al., "Solid-State NMR Studies of the Dynamics and Structure of Mouse Keratin Intermediate Filaments," Biochemistry, 1988, 27, 5418-5426.

Marshall, R.C., et al., "Structure and Biochemistry of Mammalian Hard Keratin," Electron Microsc. Rev., vol. 4 pp. 47-83, 1991.

Myers, S. R., et al., "Epidermal differentiation and dermal changes in healing following treatment of surgical wounds with sheets of cultured allogeneic keratinocytes," J. Clin Pathol 1995; 48:1087-1092.

(56) References Cited

OTHER PUBLICATIONS

Rhodes, et al., "Characteristics of the Alpha-Keratose Fraction of Hair Inducing Ascosporogenesis in Nannizzzia Grubyia," U. of IL at the Medical Center Chicago, IL, 29.IX.1966.

Skerrow, David, et al., "Epidermal α-keratin is neutral-buffer-soluble and forms intermediate filaments under physiological conditions in vitro," Biochimia et Biophysica Acta 915 (1987) 125-131.

Stokes, Glenn, D., et al., "Passage of water and electrolytes through natural and artificial keratin membranes," Desalination, 42 (1982) 321-328.

Thomas, Helga, et al., "Isolation of the Microfibrillar Proteins of Wood in Disulfide Form," Institute at the Aachen Technical University.

van de Locht, Monika, "Reconstitution of Microfibrils from Wool and Filaments from Epidermis Proteins," Mellind Textilberichte, 1987; 10: 780.

Weber, Klaus, et al., "The structural relation between intermediate filament proteins in living cells and the α-keratins of sheep wool," The EMBO J., vol. 1 No. 10 pp. 1155-1160, 1982.

Wilk, K. E., et al., "The intermediate filament structure of human hair," Biochim Biosphy Acta, Dec. 14, 1995; 1245 (3):392-396.

Wilk, Krystyna E., et al., "The intermediate filament structure of human hair," Biochimica et Biophysica Acta 1245 (1995) 392-396.

Wormell, R. L., "18—Regenerated Protein Fibres From Wool. And Casein," The J. of the Textile Institute, Jul. 1948.

Yamauchi, et al., "Cultivation of fibroblast cells on keratin-coated substrata," Polymers for Tissue Engineering, pp. 329-340, 1998.

Yoshimizu, Hiroaki, et al., "C CP/MAS NMR Study of the Conformation of Stretched or Heated Low-Sulfur Keratin Protein Films," Macromolecules 1991, 24, 862-866.

Yu, Jialin, et al., "Human Hair Keratins," The Society for Investigative Dermatology, Inc., 1993.

Zackroff, Robert V., et al., "In vitro assembly of intermediate filaments from baby hamster kidney (BHK-21) cells," Proc Natl. Acad. Sci. USA, vol. 76, No. 12, pp. 6226-6230, Dec. 1979.

Zviak, Charles, "The Science of Hair Care.", Marcel Dekker, Inc., 1986, pp. 185-187.

* cited by examiner

BIOPOLYMER MATERIALS

BACKGROUND OF THE INVENTION

Biopolymer alternatives to synthetic polymers are of substantial interest. Sustainable produced biodegradable polymers from renewable resources provide an important technological development required for environmental sustainability of a wide range of products currently made from synthetic polymers.

A variety of natural materials have been investigated for creating biopolymer materials, including poly lactic acid, soy protein, starch, chitin, and other natural structural materials. However, problems persist with biopolymer materials, including sustainability of the material source if it is diverting potential food crops to non food uses, physical properties in particular when wet, and ability to be processed using industrial processes analogous to those used in the synthetic polymer industry.

Keratin in its natural form displays the desirable robustness often sought from synthetic polymers, but it has not been possible to manipulate keratins in a useful manner to create alternatives to synthetic polymer materials as it is not naturally thermoplastic or formable. One reason for the robustness of keratins when compared to other natural materials is the high proportion of fibrous proteins occurring in keratin materials such as horns, hooves, hair, wool, feathers and nails. The highly ordered nature of this fibrous protein, in addition to the tendency of this protein to organize into fibrous structures, are important factors in keratins being very well suited to the creation of biopolymer materials.

Previous ways of isolating keratin from natural sources have rendered materials that are promising but not practically useful in creating robust materials capable of being processed in industrially acceptable means.

A common approach to form reconstituted materials from keratin involves blending of keratin with other polymers either using solvent casting or melt processing. Blended polymers are frequently not fully biopolymeric materials and so less than ideal from a sustainability perspective, in addition they may have inadequate physical performance arising from incomplete mixing of the components. Some materials have been constructed from pure keratins by casting materials from a variety of solvents, most commonly aqueous based. In these cases the form of the cast materials is limited. Films and fibres are much easier to create using these processes than larger volume or substantially thicker materials. In addition these materials often posses inadequate physical properties in particular when exposed to water.

SUMMARY

The present disclosure includes articles of manufacture and processes for manufacture of articles comprising shaped or formed keratin protein preparations. Dry powder or wetted powder preparations of keratin are subjected to pressure and optionally heat to raise the keratin to a glass transition or flowable plastic state. The keratin preparation can then be molded by being allowed to return to ambient conditions in a mold, or it can be extruded and shaped. The molded or shaped products exhibit good physical strength and wet strength and can be made more water resistant or flexible through the addition of plasticizers or by the use of elastomeric keratin co-polymers.

The molded articles are useful in many fields of products, including but not limited to medical devices such as implants, including but not limited to orthopedic implants, spinal implants, fillers, screws, or fasteners, tissue expanders or scaffolds, artificial tissues or organs, wound healing bandages or wound repair materials, structural articles such as bottles or containers, and can also be coextruded with pharmaceutically active agents as melt extruded excipients, for example.

Throughout this disclosure, unless the context dictates otherwise, the word "comprise" or variations such as "comprises" or "comprising," is understood to mean "includes, but is not limited to" such that other elements that are not explicitly mentioned may also be included. Further, unless the context dictates otherwise, use of the term "a" or "the" may mean a singular object or element, or it may mean a plurality, or one or more of such objects or elements.

DETAILED DESCRIPTION

Keratin is a family of proteins characterized by a high degree of the amino acid cysteine, which imparts a high degree of crosslinking to keratin proteins through disulfide links. Keratin proteins are present in a wide range of biological tissue, performing a structural role in skin, hair and other materials.

Keratin is naturally insoluble and occurs in a form such as wool or feathers that is not readily processable into forms useful as biopolymer products. However, keratin can be modified to become soluble and then isolated as in a powder form for use as a feedstock to create biopolymer materials using compression methods. Any process for creating powder forms of keratin can be used to generate a form of keratin suitable for compression methods.

One such process involves chemically modifying keratin to form S-sulfonated keratin as described in U.S. Pat. No. 7,148,327, issued Dec. 12, 2006, incorporated herein by reference. S-sulfonated keratin refers to keratin protein that has undergone a process wherein the disulfide bonds between cystine amino acids in keratin protein are reversibly modified to create polar functional groups that allow for controlled re-introduction of the natural disulfide crosslinks originally present in the keratin protein. S-sulfonated keratins have cysteine/cystine present predominantly in the form of S-sulfocysteine. This highly polar group imparts a degree of solubility to proteins. Whilst being stable in solution, the S-sulfo group is a labile cysteine derivative, highly reactive towards thiols, such as cysteine, and other reducing agents. Reaction with reducing agents leads to conversion of the S-sulfo cysteine group back to cystine. S-sulfo cysteine is chemically different from cysteic acid, although both groups contain the $SO_3^-$ group. Cysteic acid is produced irreversibly by the oxidation of cysteine or cystine and once formed cannot form disulfide crosslinks back to cysteine. S-sulfocysteine is reactive towards cysteine and readily forms disulfide crosslinks. Both s-sulfonated and oxidized cysteic acid containing proteins are useful in the practice of the present disclosure.

In the case of S-sulfonated keratin protein, the conversion of the S-sulfonate form to the crosslinked disulfide form may be accomplished through application of reducing conditions, for example, by applying a thiol. S-sulfonated keratin protein may be prepared by a variety of methods, including those described in U.S. Pat. No. 7,148,327, issued Dec. 12, 2006, incorporated herein by reference.

The mechanism for modifying the cystine disulfide bond to cysteine S-sulfonate is summarized as follows, wherein K is keratin:

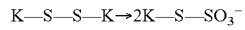

The mechanism for reforming the crosslinks may be summarized as follows, wherein K is keratin and R is a reducing agent:

$$K\text{—}S\text{—}SO_3^- + R\text{—}S^- \rightarrow K\text{—}S\text{—}S\text{—}R + SO_3^{2-}$$

$$K\text{—}S\text{—}S\text{—}R + R\text{—}S^- \rightarrow K\text{—}S^- + R\text{—}S\text{—}S\text{—}R$$

$$2K\text{—}S\text{—}SO_3^- + R\text{—}S^- \rightarrow K\text{—}S\text{—}S\text{—}K + SO_3^{2-}$$

The keratin protein may be a keratin protein fraction. Keratin protein fractions are distinct groups from within the keratin protein family, and include intermediate filament proteins, high sulfur proteins and high glycine-tyrosine proteins.

Intermediate filament proteins are described in detail by Orwin et al. (*Structure and Biochemistry of Mammalian Hard Keratin*, Electron Microscopy Reviews, 4, 47, 1991) and also referred to as low sulfur proteins by Gillespie (Biochemistry and physiology of the skin, vol. 1, Ed. Goldsmith Oxford University Press, London, 1983, pp. 475-510). Key characteristics of intermediate filament protein family are molecular weight in the range 40-60 kD and a cysteine content (measured as half cystine) of around 4%.

The high sulfur protein family is also well described by Orwin and Gillespie in the same publications referenced above. This protein family has a large degree of heterogeneity, but can be characterized as having a molecular weight in the range 10-30 kD and a cysteine content of greater than 10%. A subset of this family is the ultrahigh sulfur proteins, which can have a cysteine content of up to 34%.

The high glycine-tryosine protein family is also well described by Orwin and Gillespie in the same publications referenced above. This family is also referred to as the high tyrosine proteins and has characteristics of a molecular weight less than 10 kD, a tyrosine content typically greater than 10% and a glycine content typically greater than 20%.

For the purpose of this disclosure, a "keratin protein fraction" is a purified form of keratin that contains predominantly, although not entirely, one distinct protein group as described above.

The soluble keratin protein or protein fraction may also be intact. The term intact refers to proteins that have not been significantly hydrolyzed, with hydrolysis being defined as the cleavage of peptide bonds through the addition of water. Gillespie considers intact to refer to proteins in the keratinized polymeric state and further refers to polypeptide subunits which complex to form intact keratin in wool and hair. These are equivalent to the keratin proteins in their native form without the disulfide crosslinks formed through the process of keratinization.

Intact keratin proteins and keratin protein fractions are discussed in greater detail in co-pending, co-owned U.S. patent application Ser. No. 10/583,445, filed Jun. 19, 2006 and of which the entire application is hereby incorporated by reference.

The keratin may also be oxidized keratin. Oxidized keratins are produced as a result of exposing keratins to oxidizing agents, resulting in the conversion of cystine to cysteic acid and the keratin being converted to a soluble or a powder form.

The keratin may also be reduced keratin. Reduced keratins are produced as a result of exposing keratins to reducing agents, such as thiols, phosphines or other similar reducing agents. This converts the cystine present to cysteine or an alternative derivative, cleaving the crosslinks and converting the insoluble keratin into a soluble form that can be dried to a powder form.

Keratins can be drawn from any keratin source, including wool, feathers, animal or human hair, hooves, horns, nails, skin, claws, beaks.

In certain embodiments, the keratin molecules can be an isolated fraction that is primarily beta-keratin. Beta keratins are proteins that form into a beta-pleated sheet structure. They are principle constituents of the corneous material of the carapace and plastron of turtles, the epidermis of snakes and the feathers of birds. Some beta keratins, particularly avian keratins, for example, are characterized by a higher proportion of serine, threonine, tyrosine, and cysteine amino acids. An excellent source of beta keratin materials is bird feathers, including the by-products of poultry processing.

In the practice of the disclosure, a keratin source such as cleaned poultry feathers is subjected to fractionation, either by oxidation, including oxidative sulfitolysis, oxidation followed by reduction, or reduction, and filtered, in aqueous or alcohol solution. After filtration, either the soluble filtrate or the insoluble portion retained by the filtration can be used in the practice of the disclosure. The insoluble portion is primarily beta keratin and can include 70, 80, 90 or even 95% protein derived from the beta keratin portion of the source protein.

The beta keratin is then compression molded at pressure and temperature required for plastic flow of the materials to form a molded article.

Keratins are not previously known to be processable using conventional industrial polymer processes, such as those using heat, compression and extrusion.

It has been determined that it is possible to achieve fusion of keratin protein particles by applying heat and compression. Furthermore the fused material can achieve plastic flow under these conditions and so be processable using conventional industrial methods.

Simple compression of keratins can produce useful materials, but these materials do not readily undergo substantial shape changes or the fusing of particles together. To achieve desirable plastic flow characteristics and fusion of the keratins into one material it is necessary to add the correct amount of water to allow the keratins to undergo a phase transition under pressure, but not be too wet to prevent fusion of the keratins under those same conditions. A desirable ratio of water to keratin is 1 to 4. The proportion of water to keratin will depend in part on the keratin source and the keratin fraction. Wool, for example, has a lower concentration of hydrophobic proteins in the matrix, and thus has a substantially higher glass transition temperature than human hair keratin, reported to be 144° C. for human hair and 174° C. for wool (Wortmann et al., *Biopolymers* 2006 Apr. 5; 81(5):371-5). The glass transition is also dependent on the water concentration. Katoh et al., (Biomaterials, 2004 (25) 2265-2272) found no transition in dehydrated wool S-sulfo keratin and a decreasing transition temperature as the water content increased. The examples described herein also demonstrate that the glass transition can be achieved for keratin at ambient temperature by applying pressure to hydrated keratin.

In the practice of a preferred embodiment, water is added to dry keratin protein particles and allowed to equilibrate so that the water is evenly distributed in the keratin protein. The correct amount of water is required to facilitate reorganization of protein molecules. Too much water impedes the fusion of protein molecules and the resulting materials are of inferior physical properties. Depending on the keratin protein used, and the article to be manufactured, water can be added to a concentration of from about 10% to about 50% w/w. As stated, less water needs to be added to human hair keratin relative to wool, and still less water is added to alpha keratin or to intact intermediate filament proteins.

The keratin protein powder is compressed to a pressure of from about 3 MPa to about 700 MPa as required. This pressure is required to achieve fusion and plastic flow of the keratin. Below pressure of 3 MPa protein particles do not coalesce and the resulting materials are of inferior physical properties.

Heating the keratin protein when under compression enhances the ability of the proteins to fuse and also flow in a similar manner to a thermoplastic polymer and so achieve desirable physical forms. Heating under compression to from about 40° C. to about 175° C. raises the keratin and water combination past its glass transition temperature and as a result enhances the plastic flow. Precise heating temperature depends on the exact nature of the keratin under compression. S-sulfonated keratin intermediate filament protein is heated to 70° C. under compression to achieve robust biopolymer materials.

Without limiting the practice of the present disclosure to any particular theory, it is contemplated that robust physical properties are achieved as a result of the keratin proteins becoming organized or aligned during the compression process. In order to achieve this the keratins are preferable of high molecular weight, and not hydrolyzed or of low molecular weight. They are preferably intact proteins.

In certain embodiments substantially intact intermediate filament proteins are used. These proteins are known for a high degree of order and fibrous structure. As a result the fibrous intermediate filament proteins can achieve a degree of order during the compression process resulting in robust materials for the article of manufacture. Other protein fractions, such as the high sulfur proteins and the high glycine high tyrosine proteins, also undergo compression to create materials suitable for some articles.

Water added to the keratin prior to compression is removed during the compression process. Achieving adequate dehydration is important to achieve adequate wet strength in the resulting material. Dehydration allows enhanced interaction of the keratin proteins, with the intermediate filaments undergoing multiple polar and non-polar interactions between fibrous protein chains. The combined effect of the close interaction between protein molecules resists penetration of water in the resulting materials.

Maintaining physical strength when wet is a desirable characteristic of biopolymer materials. One method of achieving this is to reduce the polarity of the keratin proteins by using keratins in an acidic form, or keratins at their isoelectric point. The use of s-sulfonated keratin in an acidic form creates materials with substantially reduced solubility when compared to using keratins with a greater degree of ionic groups or sulfonic acid salts. S-sulfonated keratins in the acid form, produced as a result of sulfitolysis, and oxidized keratins in the acidic form, produced as a result of oxidation, or lanthionized keratins can be compressed to produce biopolymer materials with good physical strength.

Desirable physical properties when wet are achieved in the materials produced by compression molding. The materials can be maintained in water at ambient or elevated temperatures for extended periods and maintain dimensional stability. Maintaining in water causes some reduction in rigidity, but not so much as to reduce the usefulness of the material in biopolymer applications.

Polar forms of keratin, such as oxidized or s-sulfonated keratins in the salt form, can be treated after compression to create acidic forms. Treatment can be achieved with acids, such as mineral acids or organic acids. Treatment can also be achieved with thiol acids which have the additional advantage of reforming disulfide crosslinks in the keratin materials, further enhancing wet strength.

Another method for maintaining physical strength when wet is to use keratins in a reduced form or a disulfide bonded form. When processed using compression these keratins can be molded to form robust materials with desirable physical properties when wet.

Physical properties can be further enhanced by treatment of the materials with additional crosslinking agents, such as those commonly used in protein crosslinking. These include aldehydes, epoxides, anhydrides etc. Cross-linked keratin polymers or elastomers can also be prepared with silane cross-linking agents in which silane or siloxide polymers include epoxide or vinyl terminated polymers covalently bound to keratin proteins.

Keratin protein can thus be treated with crosslinking agents prior to compression, so that a treated powder is compressed, or following compression, so that the resulting material in its finished shape is treated. It is also understood that in certain embodiments, a molded article may not be in the final, functional shape, but that the molded material can be further shaped by cutting, grinding, or polishing.

Rigidity of the biopolymer materials can be reduced to achieve desirable flexible materials by inclusion of plasticizing agents in the mixture prior to compression. Plasticizing agents can be selected from any common plasticisers, including glycerol, polyethylene glycol or similar polyols. Preparation of a flexible biopolymer material is achieved by hydrating s-sulfonated keratin protein powder with an aqueous solution of 1-5% glycerol at a ratio of keratin to plasticizer solution of 4 to 1 prior to compression.

EXAMPLES

Example 1

Acidified S-sulfonated keratin intermediate filament protein, as a dry powder, was combined with water in the ratio 4:1 by mass. The mixture was allowed to equilibrate under ambient conditions for 12 hours. Following equilibration, the mixture was transferred to a cylindrical mold of diameter 38 mm and subjected to a pressure of 25 MPa for a time of 20 minutes. On removal from the mold the protein powder had fused to a single protein block of transparent amber appearance. The block was then able to be machined to any desired shape. The block was immersed in boiling water for 2 hours and no observable changes in appearance or dimension occurred. The block was further immersed in water at ambient temperature for 2 weeks and no observable changes in appearance or dimension occurred. In both cases the block became more flexible.

Example 2

Protein was prepared and molded in an identical manner to example 1, however, the mold used for compression and the protein, water mix was pre heated to 70° C.

Example 3

Acidified S-sulfonated keratin intermediate filament protein, as a dry powder was combined with a plasticizer solution (glycerol at 20% w/w in water) in the ratio of 4:1. The mixture was allowed to equilibrate under ambient conditions for 12 hours. Following equilibration the mixture was molded as described in example 1. The resulting block was less rigid compared to the block prepared in example 1 and could more readily be machined to a desired shape.

Example 4

Acidified S-sulfonated keratin intermediate filament protein was treated with an ammonium thioglycollate (0.25 M, 0.1 M potassium phosphate buffered to pH 7.4) for 1 hour, washed thoroughly with water and lyophilized. The resulting material was ground to a powder and then combined with water in the ratio of 4:1. The mixture was allowed to equilibrate under ambient conditions for 12 hours. Following equilibration the mixture was molded as described in example 1.

Example 5

The block produced in example 1 was crosslinked in an aqueous solution of glutaraldehyde (5% w/w) for 30 minutes at ambient temperature. Following drying the resulting block had greater rigidity than that produced in example 1.

Example 6

Oxidized keratin is combined with water in the ratio of 4:1. The mixture is allowed to equilibrate under ambient conditions for 12 hours. Following equilibration the mixture is molded as described in example 1.

Example 7

Lanthionised keratin is combined with water in the ratio of 4:1. The mixture is allowed to equilibrate under ambient conditions for 12 hours. Following equilibration the mixture is molded as described in example 1.

While particular embodiments of the invention and method steps of the invention have been described herein in terms of preferred embodiments, additional alternatives not specifically disclosed but known in the art are intended to fall within the scope of the disclosure. Thus, it will be apparent to those of skill in the art that variations may be applied to the materials, devices and/or methods and in the steps or in the sequence of steps of the methods described herein without departing from the concept, spirit and scope of the invention. All such similar substitutes and modifications apparent to those skilled in the art are deemed to be within the spirit, scope and concept of the invention as defined by the appended claims.

The invention claimed is:

1. A process for producing an article of manufacture comprising;
   subjecting is keratin source to chemical fractionation effective to break cystine-cystine bonds to obtain a solution of substantially intact keratin fractions;
   filtering the solution of keratin fractions and retaining the soluble portion;
   acidifying the soluble portion to obtain an acidified keratin fraction;
   drying the acidified keratin fraction to obtain a dry powder keratin preparation;
   hydrating the dry powder keratin preparation at a ratio of water to keratin of 1-4 to achieve a water hydrated keratin protein preparation; and
   applying pressure and optionally heat to the hydrated keratin protein preparation sufficient to reach the glass transition state of the keratin protein preparation to obtain a shapeable or moldable keratin material for an article of manufacture.

2. The process of claim 1, including confining the keratin protein preparation in a mold to produce a molded article.

3. The process of claim 1, including extruding the keratin protein preparation.

4. The process of claim 3, further comprising shaping the extruded product.

5. The process of claim 1, wherein the keratin protein preparation is subject to a pressure from about 3 MPa to about 700 MPa.

6. The process of claim 1, wherein the keratin protein preparation is subject to a temperature of from about 50° C. to about 170° C.

7. The process of claim 1, wherein the keratin protein preparation is substantially a single protein fraction.

8. The process of claim 1, wherein the keratin protein preparation is substantially intermediate filament protein.

9. The process of claim 1, wherein the keratin protein preparation is substantially high sulfur protein.

10. The process of claim 1, wherein the keratin protein preparation is substantially high glycine, high tyrosine protein.

11. The process of claim 1, wherein the keratin protein preparation is substantially sulfonated.

12. The process claim 1, wherein the keratin protein preparation is substantially oxidized.

13. The process of claim 1, wherein the keratin protein preparation is substantially reduced.

14. The process of claim 1, wherein the keratin protein preparation is treated with a cross-linker or an acid before compression.

15. The process of claim 1, wherein the keratin protein preparation is treated with a cross-linker or acid after compression.

16. The process of claim 1, wherein the keratin protein preparation is plasticized.

* * * * *